(12) United States Patent
Ito et al.

(10) Patent No.: US 6,521,311 B2
(45) Date of Patent: Feb. 18, 2003

(54) LIGHT-REFLECTABLE STICKER

(75) Inventors: Kiyoshi Ito, Nagano (JP); Shinsuke Shima, Tokyo (JP)

(73) Assignee: Yao Sangyo Kabushiki Kaisha, Tokyo (JP)

( * ) Notice: Subject to any disclaimer, the term of this patent is extended or adjusted under 35 U.S.C. 154(b) by 41 days.

(21) Appl. No.: 09/800,927

(22) Filed: Mar. 8, 2001

(65) Prior Publication Data

US 2002/0076518 A1 Jun. 20, 2002

(30) Foreign Application Priority Data

Dec. 15, 2000 (JP) ........................................ 2000-382224

(51) Int. Cl.[7] .............................................. B42D 15/10
(52) U.S. Cl. .................... 428/40.1; 428/40.2; 428/41.7; 428/42.1; 428/42.2; 428/42.3; 428/43; 428/192; 428/914
(58) Field of Search ............................... 428/40.1, 40.2, 428/41.7, 42.1, 42.2, 42.3, 43, 192, 914; 345/435; 355/22, 77

(56) References Cited

FOREIGN PATENT DOCUMENTS

| JP | A5317105 | 12/1993 |
|----|----------|---------|
| JP | 3061703  | 6/1999  |
| JP | 3068227  | 2/2000  |

*Primary Examiner*—Nasser Ahmad
(74) *Attorney, Agent, or Firm*—Birch, Stewart, Kolasch & Birch, LLP

(57) ABSTRACT

The light-reflectable sticker is fashionable, attractive and can be used in many fields. In the light-reflectable sticker, a sticking sheet member is capable of sticking on skin. The sticking sheet member is stuck on a separate sheet member. A sticker proper is peelably stuck on the sticking sheet member by an adhesive layer. The sticker proper includes a base sheet member, a light-reflectable film member and a soft member provided between the base sheet member and the light-reflectable film member. The base sheet member and the light-reflectable film member are welded along an outline of the sticker proper, and the base sheet member is stuck on the separate sheet member with the adhesive layer and the sticking sheet member.

4 Claims, 3 Drawing Sheets

FIG.3
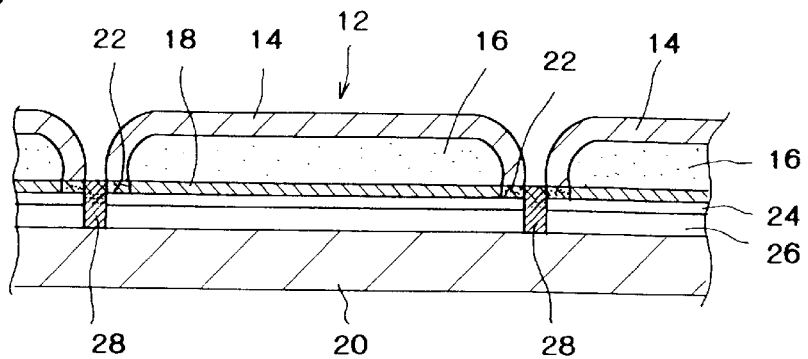
FIG.4A
FIG.4B
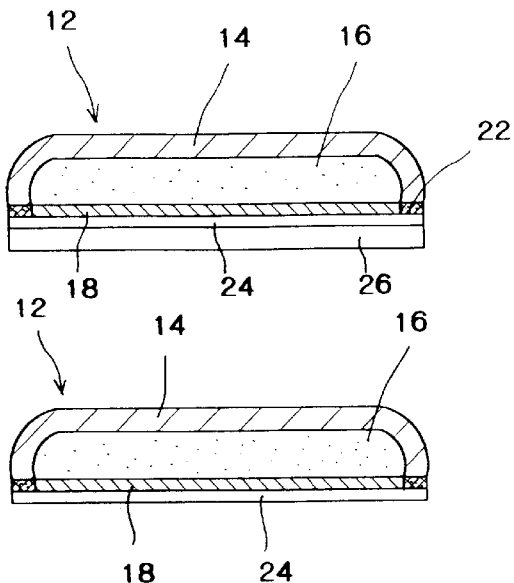
FIG.5
PRIOR ART
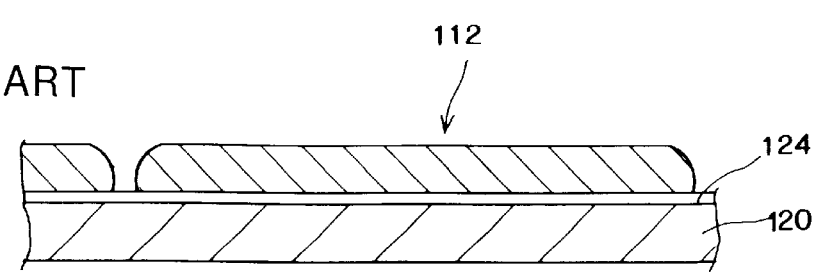

LIGHT-REFLECTABLE STICKER

BACKGROUND OF THE INVENTION

The present invention relates to a light-reflectable sticker, more precisely relates to a light-reflectable sticker whose character indicating section includes a light-reflectable film.

Stickers are used, as labels, emblems, etc., in many fields. Stickers can be easily made with many kinds of designs and easily made of many kinds of materials. In conventional stickers, letters or characters are printed on surfaces, a notch line for separation is formed along an outline, an adhesive is provided on a rear face of the sticker. And the sticker is peelably adhered on a separate paper. When the sticker is used, the sticker is peeled off from the separate paper and adhered onto an object place.

In the mean time, the inventor of the present filed some inventions: a light-reflectable button (see Japanese Patent Gazette No. 5-317105), in which a light-reflectable film is adhered on a button base and a surface of the light-reflectable film is covered with transparent resin; light-reflectable accessories (see Japanese Utility Model No. 3061703), in which light-reflectable films are respectively included in a badge, a cuff button, a tiepin, a pendant, etc.; and a light-reflectable emblem (see Japanese Utility Model No. 3068227), in which a rear face of a light-reflectable film is covered with a backing film and a light-reflecting face of the light-reflectable film is covered with a transparent film. The light-reflectable button, the light-reflectable accessories and the light-reflectable emblem respectively include the light-reflectable films, which are capable of reflecting light. The light-reflecting faces of the light-reflectable films brightly glint when light irradiates the light-reflecting faces of the button, accessories or emblem, so that the products can be more fashionable and attractive than conventional ones.

However, unlike the light-reflectable articles invented by the inventor of the present invention, conventional stickers are not attractive in spite of wide use. Namely, attractive stickers are required now.

SUMMARY OF THE INVENTION

To solve the problem of the conventional stickers, the inventors tried to use the light-reflectable films as parts of stickers. As described above, the stickers have many kinds of designs and are used in many fields, so the inventors think that the light-reflectable films can be properly employed in the stickers.

An object of the present invention is to provide a light-reflectable sticker, which is fashionable, attractive and can be used in many fields.

To achieve the object, the light-reflectable sticker of the present invention comprises:

a separate sheet member;

a sticking sheet member for sticking on skin, the sticking sheet member being stuck on the separate sheet member; and a sticker proper being peelably stuck on the sticking sheet member by an adhesive layer, the sticker proper including:
  a base sheet member;
  a light-reflectable film member having retroreflecting function; and
  a soft member being provided between the base sheet member and the light-reflectable film member, wherein the base sheet member and the light-reflectable film member are welded along an outline of the sticker proper, and the base sheet member is stuck on the separate sheet member with the adhesive layer and the sticking sheet member.

In the light-reflectable sticker, the light-reflectable film member may include:

a transparent surface film;

a sealing film being stuck together with the transparent surface film, the sealing film holding a light-reflectable member having microprism function; and a thin air layer being formed between the transparent surface film and the sealing film.

In the light-reflectable sticker, the abrasive layer may be formed on the base sheet member.

In the light-reflectable sticker, a notch line for separation may be formed along the outline of the sticker proper.

In the light-reflectable sticker of the present invention, the light-reflectable film has high light-reflectivity, so that the sticker having the light-reflecting function, which is not given by the conventional stickers, can be provided. By the sticking sheet member for sticking on the skin, the light-reflectable sticker can be properly stuck on a cheek, etc. Therefore, the light-reflectable sticker can be used in new fields, in which no conventional stickers were used.-Please

BRIEF DESCRIPTION OF THE DRAWINGS

Embodiments of the present invention will now be described by way of examples and with reference to the accompanying drawings, in which:

FIG. 3 is a sectional view of the light-reflectable sticker;

FIG. 4A is a sectional view of a sticker proper peeled off from a separate sheet member;

FIG. 4B is a sectional view of the sticker proper peeled off from the separate sheet member; sticker;

FIG. 5 is a sectional view of the conventional sticker;

DETAILED DESCRIPTION OF THE PREFERRED EMBODIMENTS

Preferred embodiments of the present invention will now be described in detail with reference to the accompanying drawings.

Figure 1:
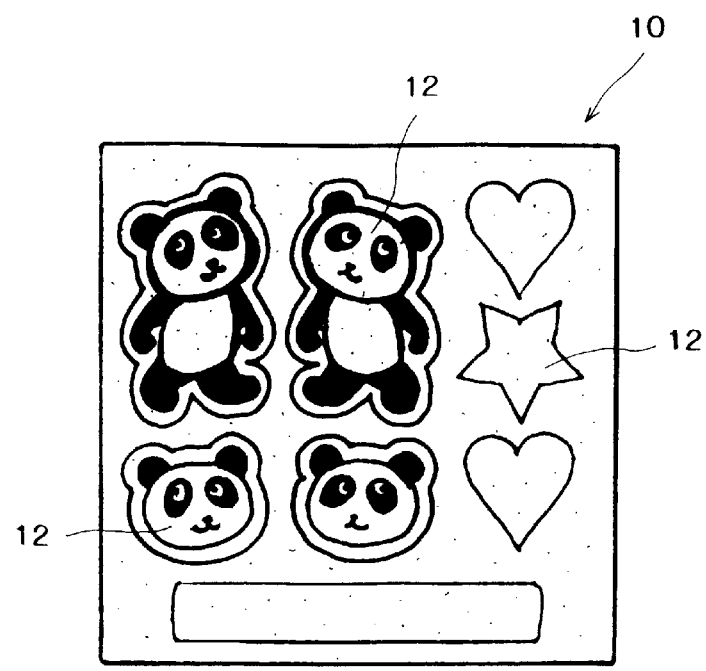
FIG. 1 is a plan view of the light-reflectable sticker of an embodiment of the present invention.
Figure 2:
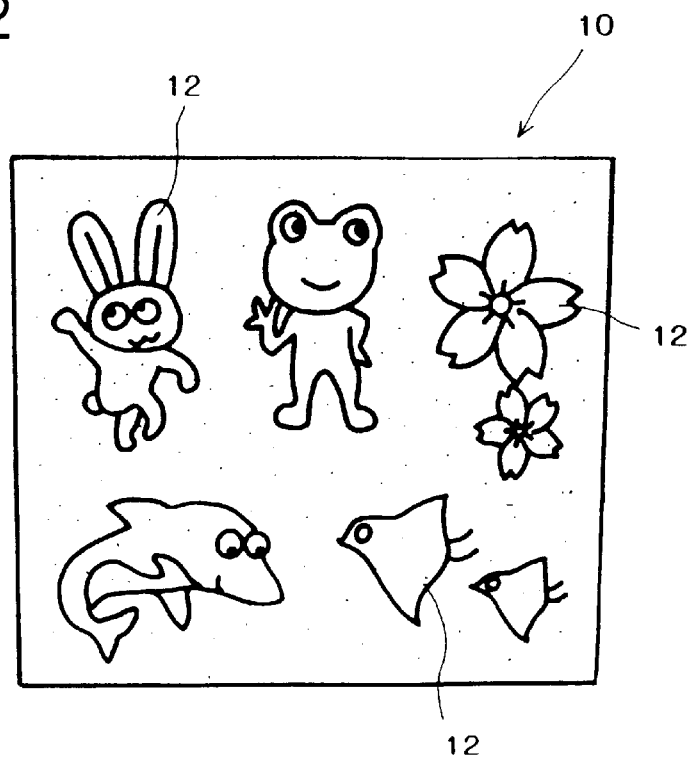
FIG. 2 is a plan view of the light-reflectable sticker of another embodiment of the present invention.

FIGS. 1 and 2 are plan views of the light-reflectable stickers of the embodiments of the present invention. Sticker propers 12, in each of which a picture or character shown, are stuck on separate sheet members as well as the conventional sticker.

The sticker propers 12 of pandas, hearts and star are included in the light-reflectable sticker 10 shown in FIG. 1; the sticker propers 12 of animals and plants are included in the light-reflectable sticker 10 shown in FIG. 2.

Planar shapes of the sticker propers 12 are designed according to the pictures and the characters, and separation notches are formed along outlines of the pictures and the characters so as to easily separate the sticker propers 12 from the separate sheet members. Therefore, the sticker propers 12 can be independently used.

The feature of the light-reflectable sticker 10 is light-reflectable film members, each of which constitutes a surface of each sticker proper 12, capable of effectively reflecting light, which is irradiated toward the sticker propers 12.

The sticker proper 12 may be made of the light-reflectable film member only. But, in the stickers 10 of the embodiments, soft members, which are made of, for example, urethane, are used as bases of the light-reflectable film members. Surfaces of the soft members are respectively covered with the light-reflectable film members. With this structure, the sticker propers 12 are made thicker and soft. The soft and thick sticker propers 12 can be securely stuck and easily stuck and removed.

Fig. 3 is the sectional view of the light-reflectable sticker 10. Symbols 14 stand for the light-reflectable film members; symbols 16 stand for the soft members; a symbol 18 stands for a base sheet member; and a symbol 20 stands for the separate sheet member. In each of the sticker propers 12, the soft member 16 is sandwiched between the base sheet member 18 and the light-reflectable film member 14. The base sheet member 18, the soft member 16 and the light-reflectable film member 14 are heat-welded along the outline of the sticker proper 12, so that a surface of the soft member 16 is covered with the light-reflectable film member 14. Symbols 22 stand for heat-welded sections of the base sheet member 18, the soft member 16 and the light-reflectable film member 14. Note that, at least the light-reflectable film member 14 and the base sheet member 18 should be heat-welded so as to accommodate the soft member 16 between the light-reflectable film member 14 and the base sheet member 18.

An adhesive layer 24 is formed on a bottom face of the base sheet member 18. A sticking sheet member 26 is provided under the adhesive layer 24. The sticking sheet member 26 comprises a film and sticking layers formed on the both faces of the film, so that the sticking sheet member 26 is peelably stuck on the separate sheet member 20. Namely, the sticker proper 12 is held on the separate sheet member 20 by the adhesive layer 24 and the sticking sheet member 26.

Note that, an adhesive constituting the adhesive layer 24 is capable of effectively adhered on paper, wood, plastics, metals, etc. On the other hand, the sticking sheet member 26 is usually used in a medical field, so it can be well stuck on human skin with great sticking force and does not badly influence the human skin even if it is stuck for a long time. Further, the sticking sheet member 26 has enough moisture permeability and can be reused many times.

Notch lines 28 for separating the sticker propers 12 are formed, in the adhesive layer 24 and the sticking sheet member 26, along the outlines of the sticker propers 12. By forming the notch lines 28, the sticker propers 12 can be independently separated from the separate sheet member 20. Namely, the sticker propers 12 are stuck on the separate sheet member 20 together with the adhesive layer 24 and the sticking sheet member 26 before use. When the sticker proper 12 is used, the sticker proper 12 can be peeled off, together with the adhesive layer 24 and the sticking sheet member 26, form the separate sheet member 20.

FIG. 4A shows the state of peeling off the sticker proper 12 from the separate sheet member 20. The sticking sheet member 26 is adhered on the bottom face of the base sheet member 18 by the adhesive layer 24. With this structure, the sticker proper 12 can be stuck to an object place. Since the soft member 18 is sandwiched between the light-reflectable film member 14 and the base sheet member 18 and the light-reflectable film member 14 and the base sheet member 18 are made of soft materials, the sticker proper 12 can be softly stuck and bent along a surface shape of an object place, e.g., skin.

As described above, the feature of the light-reflectable sticker 10 is the surface of the sticker proper 12, which is constituted by the light-reflectable film member 14. The structure of the light-reflectable film member 14 is shown in FIGS. 6A and 6B.

Figure 6A:
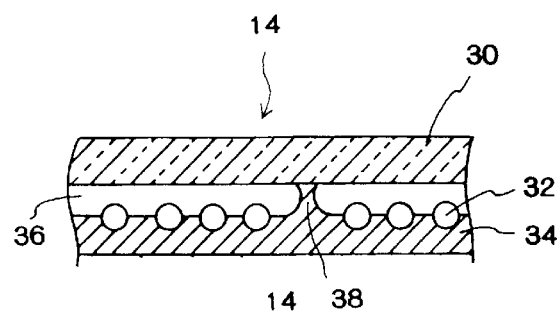
FIG. 6A is a sectional view of a light-reflectable film.
Figure 6B:
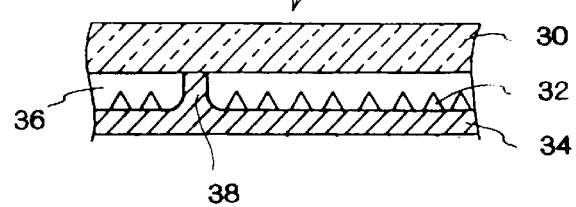
FIG. 6B is a sectional view of the light-reflectable film.

As shown in FIGS. 6A or 6B, the light-reflectable film member 14 includes: a transparent surface film 30; a sealing film 34 being stuck together with the transparent surface film 30 and holding light-reflectable members 32 having microprism function; and a thin air layer 36 being formed between the transparent surface film 30 and the sealing film 34. A supporting section 38 is formed between the transparent surface film 30 and the sealing film 34 so as to form the thin air layer 36.

In FIG. 6A, spherical lenses are employed as the light-reflectable members 32; in FIG. 6B, trihedrons are employed as the light-reflectable members 32.

In the light-refrectable film members 14, the spherical lenses and the trihedrons, which are made of transparent plastics, are employed as the light-reflectable members 32 and have microprism function, so that they are capable of retroreflecting light with very high brightness.

For example, hi gloss light-refrectable film of Scotch Light (trademark) may be employed as the light-refrectable film members 14. The film is very soft and flexible, further it can be easily heat-welded and printed. Proper retroreflection coefficient of the light-reflectable film member 14 is 200 cd/lx/m² or more, preferably 500 cd/lx/m² or more for beautiful glinting.

The light-reflectable film member 14 of the light-reflectable sticker 10 effectively reflects light and makes look more attractive. Further, pictures, characters, letters, etc. can be printed on the surface of the light-reflectable film members 14 as shown in FIGS. 1 and 2. If a character is printed on the surface of the light-reflectable film members 14, the printed part makes the brightness of the reflected light lower, so the characters, etc. are designed with considering the brightness of the reflected light. By printing pictures, characters, etc. on the light-reflectable film members 14, the printed pictures, characters, etc. can be directly seen in the daytime. On the other hand, in the night, the reflected light from the light-reflectable film members 14 are shaded by the printed parts, so that pictures, characters, etc. can be recognized.

In the present embodiments, the white soft members 16 are employed so as to improve light-reflecting efficiency of the light-reflectable film members 14, but the color of the soft members 14 may be optionally selected. If the color soft members 16, e.g., red, blue, silver, are employed, the sticker propers 12 can be visually colored. Note that, a transparent film is usually employed as the sealing film 34, but it may be colored.

The light-reflectable sticker 10 shown in FIG. 3 is manufactured by the steps of: sticking the sticking sheet member 26, whose both faces are covered with sticking agency as the sticking layers, on the surface of the separate sheet member 20; adhering the base sheet member 18, whose bottom face is covered with the adhesive layer 24, on the sticking sheet member 26; mounting the soft members 16 and the light-reflectable film members 14 on the base sheet member 18; heat-welding the light-reflectable film members 14, the soft members 16 and the base sheet member 18, by heat-welding means, along the outlines of the sticker propers 12; and forming the notch lines 28 along the outlines of the sticker propers 12. The step of forming the notch lines 28 and the step of heat-welding may be executed simultaneously.

In comparison with the light-reflectable sticker 10 of the present invention, the conventional sticker is shown in the sectional view of FIG. 5. A sticker proper 112 is adhered on a separate sheet 120 by an adhesive layer 124. Pictures, characters, etc. are printed on a surface of the sticker proper 112. The sticker proper 112 is peeled off from the separate sheet 120 and stuck on an object place by the adhesive layer 124. A base sheet of the conventional sticker is made of paper, plastic, etc., which are not light-reflectable materials, so the conventional sticker does not have the light-reflecting function.

Figure 7:
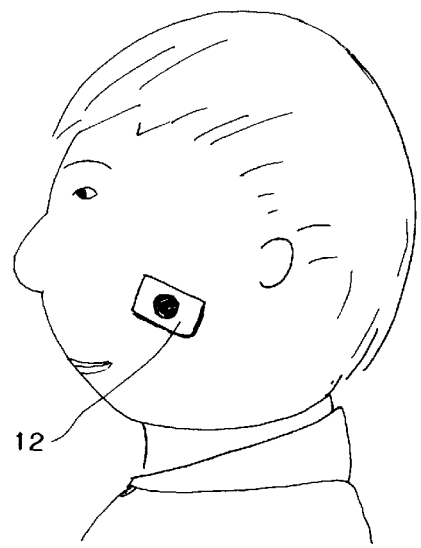
FIG. 7 is an explanation view showing an example of how to use the light-reflectable sticker.
Figure 8:
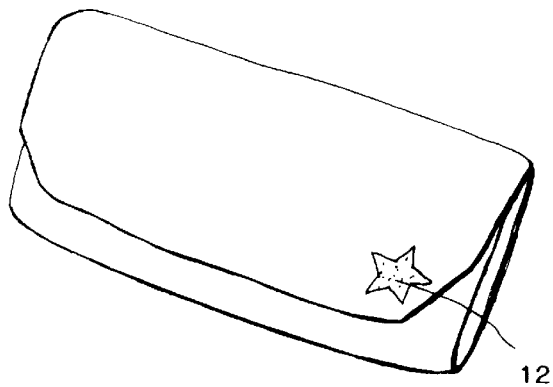
FIG. 8 is an explanation view showing another example of how to use the light-reflectable sticker.

FIGS. 7 and 8 are explanation views showing examples of how to use the light-reflectable sticker 10 of the present invention. In FIG. 7, the sticker proper 12 is stuck on a cheek of a user; in FIG. 8, the sticker proper 12 is stuck on a surface of a small article. In the case of sticking on human skin as shown in FIG. 7, the adhesive layer 24 and the sticking sheet member 26 are left on the base sheet member 18. As described above, the sticking sheet member 26 is usually used in a medical field, can be well stuck on human skin, does not badly influence the human skin and has enough moisture permeability, so the sticking sheet member 26 is left when the sticker proper 12 is properly stuck on human skin.

These days, painting letters and characters on cheeks, etc. becomes popular and fashionable. The light-reflectable sticker of the present invention has similar effects. Namely, the fashionable effects can be easily gained by sticking the sticker propers instead of painting on human skin. Especially, the light-reflecting efficiency of the light-reflectable sticker is very high, so the sticker propers are capable of beautifully glinting when the sticker propers are irradiated by light at night concerts, night games, etc.

Of course, in the daytime or when the sticker propers are not irradiated by light, the fashionable effects can be gained due to diffusion of light.

Since the sticking sheet member 26 can be reused many times, the used sticker proper 12 can be stuck on the separate sheet member 20 again to reuse.

The sticking sheet member 26 can be properly stuck on many things other than human skin. It can be properly stuck on wool, synthetic fibers, etc., so the light-reflectable sticker may be stuck on clothes. Emblems are adhered on blazer coats. The light-reflectable sticker, which is formed into a prescribed shape, may be stuck on the blazer coat instead of the emblem. The light-reflectable sticker can glint on the blazer coat as the emblem, so that the value of the clothes can be enhanced.

In the case of sticking on the small article as shown in FIG. 8, the adhesive layer 24 is left on the base sheet member 18 as shown in FIG. 4B. Namely, the sticker proper 12 is peeled off from the sticking sheet member 26. The sticker proper 12 is adhered by the adhesive layer 24. Of course, the sticker proper 12 can be stuck by the sticking sheet member 26, but the adhesive layer 24 is capable of securely adhering the sticker proper 12 on paper, wood, plastics, metals, etc. Therefore, in the case of securely adhering the sticker proper 12 on articles other than human skin, the sticking sheet member 26 is removed from the adhesive layer 24.

For example, the sticker proper 12, which has been stuck on the cheek, can be adhered on a small article by removing the sticking sheet member 26 from the adhesive layer 24.

As described above, the sticker proper 12 comprises the light-reflectable film member 14, the soft member 16 and the base sheet member 18. Shapes, characters, pictures, etc. of the sticker proper 12 can be optionally designed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A light-reflective sticker, comprising:
   a separate sheet member;
   a sticking sheet member for sticking on skin, said sticking sheet member being stuck on said separate sheet member; and
   a sticker proper being peelably stuck on said sticking sheet member by an adhesive layer, said sticker proper including:
   a base sheet member;
   a light-reflectable film member having a retroreflecting function; and
   a member being provided between said base sheet member and said light-reflective film member, to make said sticker proper have a greater thickness;
   wherein said base sheet member and said light-reflectable film member are welded along an outline of said sticker proper, and said base sheet member is stuck on said separate sheet member with said adhesive layer and said sticking sheet member.

2. The light-reflectable sticker according to claim 1, wherein said light-reflectable film member includes:
   a transparent surface film;
   a sealing film being stuck together with said transparent surface film, said sealing film holding a light-reflectable member having a microprism function; and
   an air layer being formed between said transparent surface film and said sealing film.

3. The light-reflectable sticker according to claim 1, wherein said adhesive layer is formed on said base sheet member.

4. The light-reflectable sticker according to claim 1,
   wherein a notch line for separation is formed along the outline of said sticker proper.

* * * * *